United States Patent [19]

Vdoviak et al.

[11] Patent Number: 5,775,589
[45] Date of Patent: Jul. 7, 1998

[54] COOLING APPARATUS FOR AIRCRAFT GAS TURBINE ENGINE EXHAUST NOZZLES

[75] Inventors: John William Vdoviak, Marblehead; Robert Alexander Nicoll, Beverly, both of Mass.

[73] Assignee: General Electric Company, Cincinnati, Ohio

[21] Appl. No.: 898,744

[22] Filed: Jul. 23, 1997

Related U.S. Application Data

[62] Division of Ser. No. 787,983, Nov. 5, 1991, Pat. No. 5,720,434.

[51] Int. Cl.$^6$ .................... B64D 33/04; B05B 12/00; F02C 7/20; F02K 3/10
[52] U.S. Cl. .................... 239/127.1; 239/127.3; 239/265.39; 60/39.32; 60/261; 60/267
[58] Field of Search .................... 239/265.39, 265.35, 239/265.37, 265.33, 127.1, 127.3; 60/39.32, 39.31, 261, 266, 263, 267, 271

[56] References Cited

U.S. PATENT DOCUMENTS

| | | | |
|---|---|---|---|
| 3,091,924 | 6/1963 | Wilder | 60/35.54 |
| 3,527,543 | 9/1970 | Howald | 416/90 |
| 3,623,711 | 11/1971 | Thorstenson | 263/19 A |
| 3,866,417 | 2/1975 | Velegol | 60/261 |
| 3,979,065 | 9/1976 | Madden | 239/127.3 |
| 4,071,194 | 1/1978 | Eckert et al. | 239/127.3 |
| 4,081,137 | 3/1978 | Sutton et al. | 239/127.3 |
| 4,118,146 | 10/1978 | Dierberger | 416/97 A |
| 4,171,093 | 10/1979 | Honeycutt et al. | 239/127.3 |
| 4,203,286 | 5/1980 | Warburton | 60/266 |
| 4,449,678 | 5/1984 | Hapke | 244/12.5 |
| 4,544,098 | 10/1985 | Warburton | 239/127.3 |
| 4,566,280 | 1/1986 | Burr | 60/757 |
| 4,637,550 | 1/1987 | Nash | 239/265.37 |
| 4,642,993 | 2/1987 | Sweet | 60/752 |
| 4,643,356 | 2/1987 | Holler | 239/13 |
| 4,653,983 | 3/1987 | Vehr | 416/97 R |
| 4,664,597 | 5/1987 | Auxier et al. | 416/97 R |
| 4,695,247 | 9/1987 | Enzaki et al. | 431/352 |
| 4,696,431 | 9/1987 | Buxe | 239/265.15 |
| 4,747,542 | 5/1988 | Cires et al. | 239/127.3 |
| 4,773,593 | 9/1988 | Auxier et al. | 239/127.3 |
| 4,833,881 | 5/1989 | Vdoviak et al. | 60/261 |
| 4,878,283 | 11/1989 | McLean | 29/163.6 |
| 4,896,510 | 1/1990 | Foltz | 60/757 |
| 4,923,371 | 5/1990 | Ben-Amoz | 416/97 R |
| 5,000,005 | 3/1991 | Kwan et al. | 60/757 |
| 5,181,379 | 1/1993 | Wakeman | 60/221 |
| 5,497,616 | 3/1996 | Roberts | 60/261 |
| 5,680,755 | 10/1997 | Hauer et al. | 239/265.39 |

OTHER PUBLICATIONS

R.E. Mayle et al, "Multihole Cooling Film Effectiveness and Heat Transfer," Nov. 1975, pp. 534–538.
D.A. Nealy et al, "Alternate Cooling Configuration for Gas Turbine Combustor Systems," May 1985.
Dr. G. J. Sturgess, "Advanced Low-Emissions Catalytic-Combustor Program-Phase I Final Report," Jun. 1981, Report No. NASA-CR-159656, pp. 75–76, 125–128 and 141–142.

*Primary Examiner*—Charles T. Jordan
*Assistant Examiner*—Theresa M. Wesson
*Attorney, Agent, or Firm*—Andrew C. Hess; Patrick R. Scanlon

[57] ABSTRACT

The present invention provides coolable exhaust nozzle flap and seal assemblies having liners that are spaced inward and apart from their respective flap and seal cool walls, to form a cooling passage therebetween that converges in the axial downstream flow direction. One embodiment provides single wall multi-hole film cooled nozzle flap and seal liners particularly for use individually or in combination on convergent and divergent hollow flaps and seals for variable exhaust nozzles. Flap and seal coolable assemblies may be unitary structures that are integrally fabricated or formed such as by casting.

3 Claims, 6 Drawing Sheets

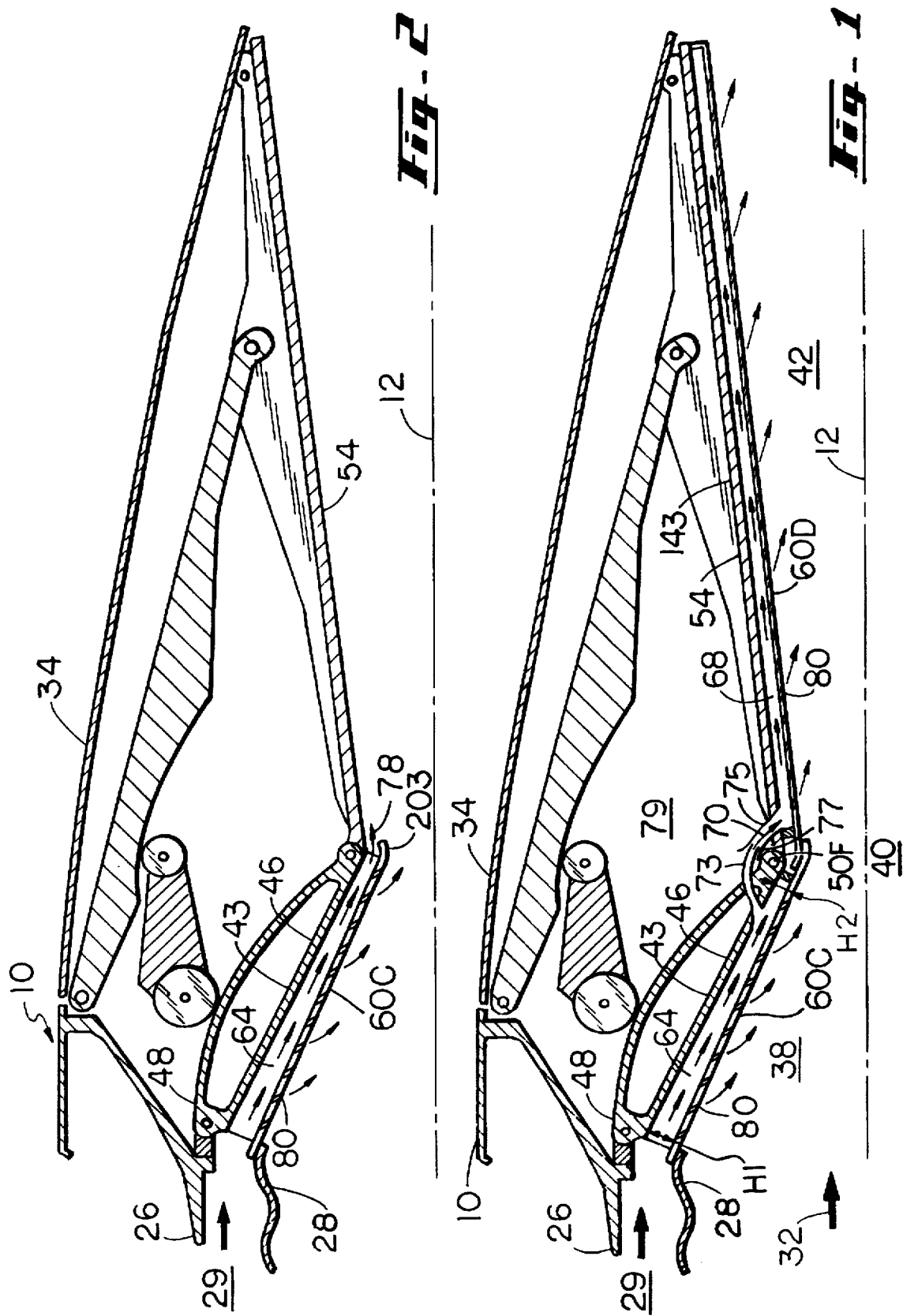

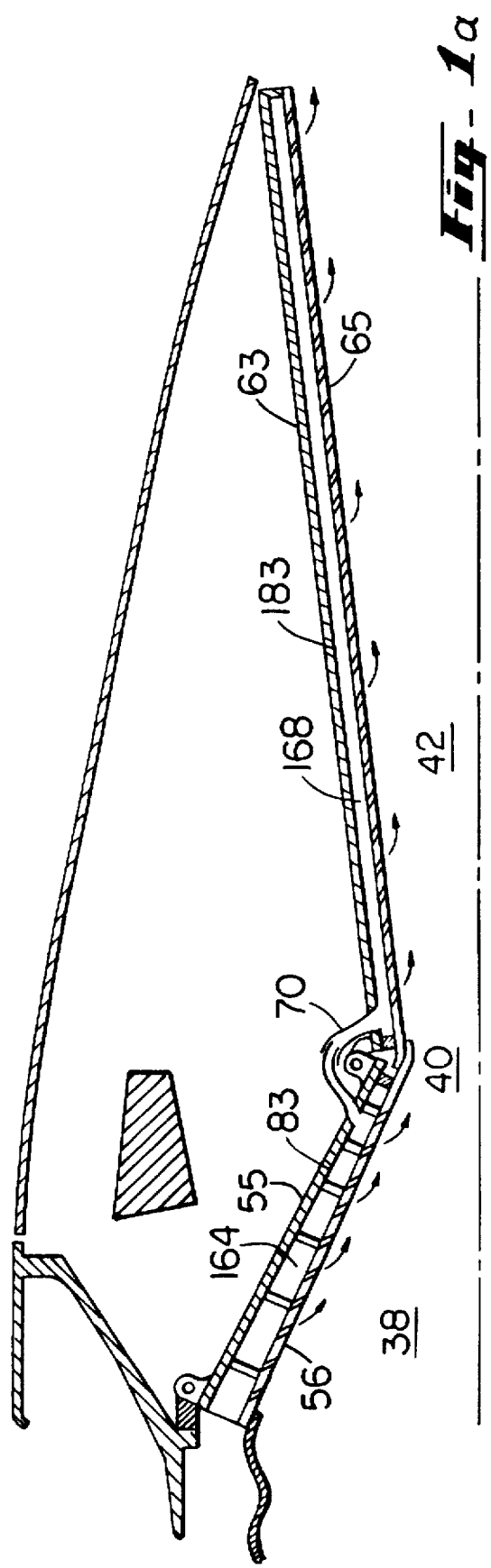

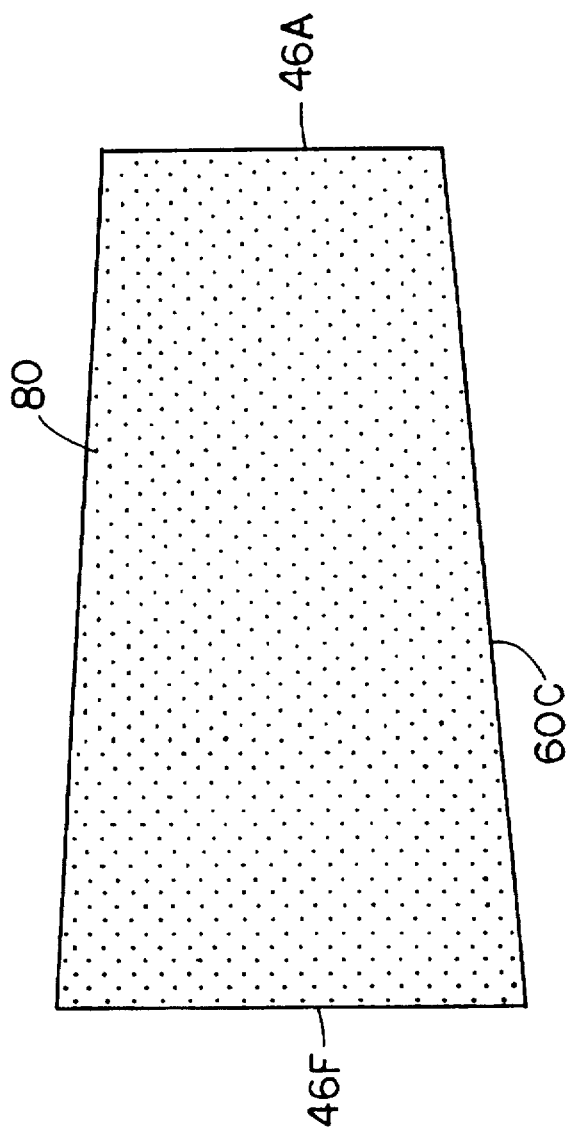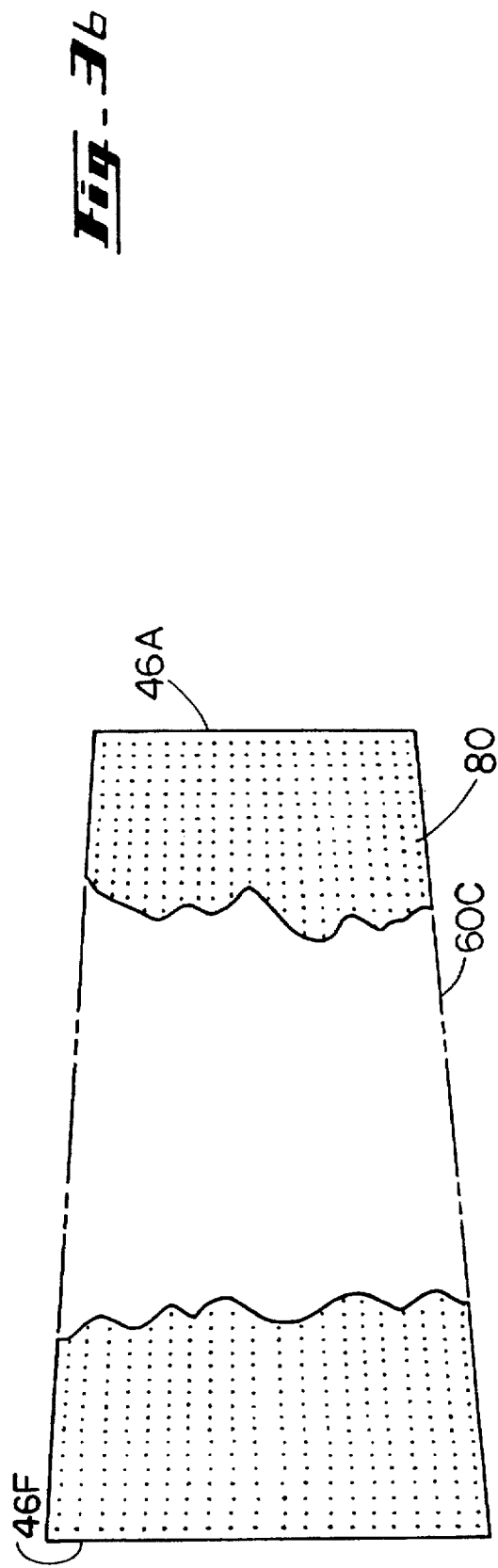

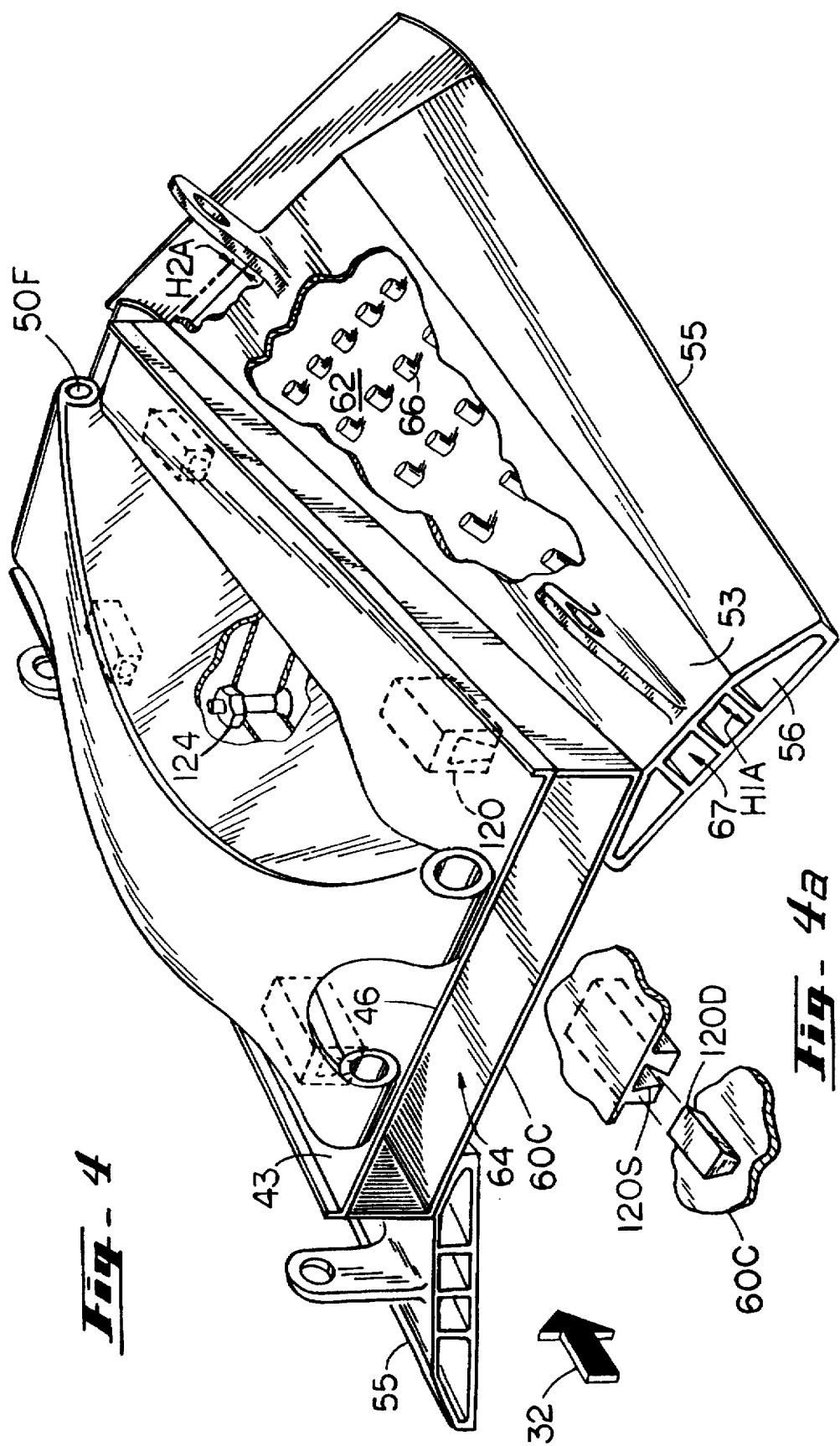

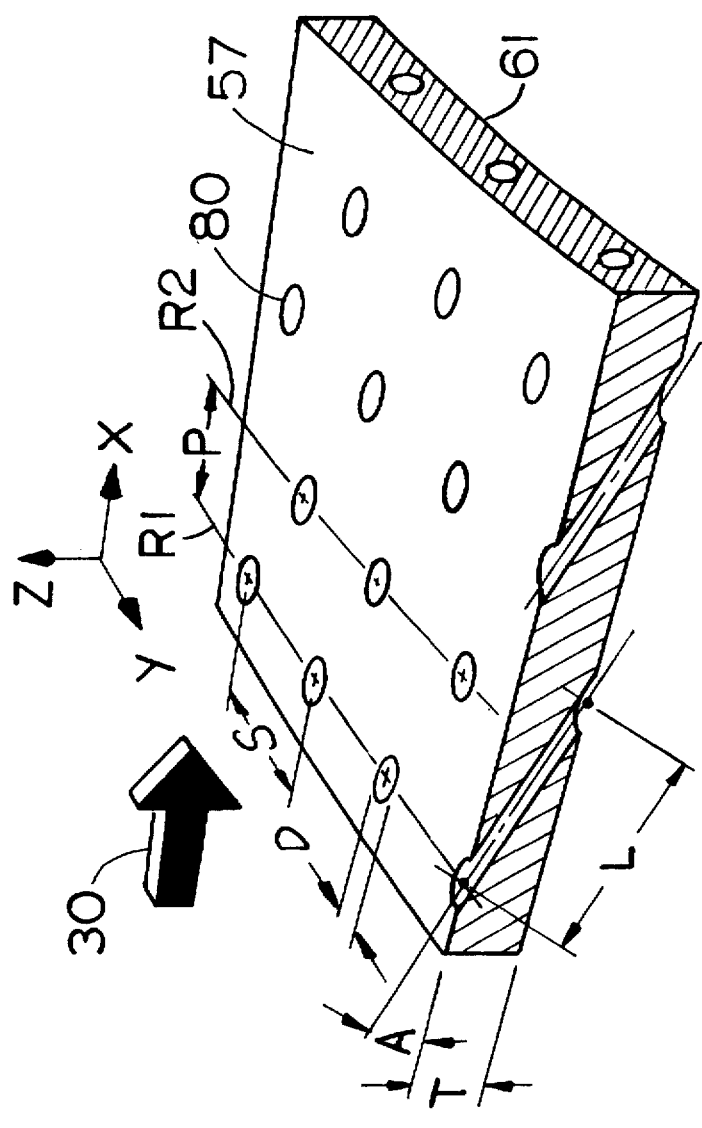
Fig_5

COOLING APPARATUS FOR AIRCRAFT GAS TURBINE ENGINE EXHAUST NOZZLES

This application is a division of application Ser. No. 07/787,983, filed Nov. 5, 1991 now U.S. Pat. No. 5,720,434.

BACKGROUND OF THE INVENTION

1. Field of the Invention

This invention relates to the cooling of aircraft gas turbine engine exhaust nozzles and more particularly to means for film cooling the liners of variable throat exhaust nozzle flaps and seals.

2. Description of Related Art

Aircraft gas turbine engines particularly of the turbo-jet and turbo-fan variety employ exhaust nozzles having containment members, namely flaps and seals, that are used to contain the hot exhaust flow and produce thrust to propel the aircraft. Cooling of the nozzle is often required in order to provide thermal protection for the nozzle and the rest of the engine as well as a reduction in the infrared signature of the engine and aircraft which is particularly important for military aircraft. Military aircraft gas turbine engines often employ variable exhaust nozzles having pivotal flaps and seals incorporating liners that are conventionally cooled by film and convective cooling and often both, such as shown in U.S. Pat. No. 4,544,098 entitled "Cooled Exhaust Nozzle Flaps" to Warburton and U.S. Pat. No. 4,081,137 entitled "Finned Surface Cooled Nozzle" to Sutton et al. Sutton discloses a convergent/divergent exhaust nozzle having essentially double wall hollow flaps wherein cooling air is supplied to a passage between the double walls and flowed therethrough thereby convectively cooling the hot wall. Sutton further provides a couple of outlets for introducing cooling air into the boundary layer to provide some film cooling of the hot wall.

Warburton discloses convectively cooled convergent flaps that supply cooling air to respective divergent flaps of an axisymmetric exhaust nozzle. The divergent flaps are film cooled by the cooling air after the cooling air has convectively cooled the convergent flaps, whereby the cooling air is exhausted onto the hot surface of the divergent flap.

As can be seen from these examples of prior art nozzles, containment members are generally hollow having liners that employ, either alone or in combination, means for convective and film cooling. Film cooling means for these liners typically employs slots to introduce film cooling air over what is often a rather extensive axially extending portion of nozzle liner.

One problem associated with the prior art nozzle liner cooling concepts described in the aforementioned patents is that neither the convective cooling or the slot means for film cooling is the most efficient method of cooling the hot liner surfaces. More efficient methods of film cooling would allow the engine to use less cooling air thereby providing savings of weight, cost, and fuel and would also permit the engine to be operated at a higher level of thrust.

Besides requiring large amounts of cooling air to thermally protect the liners and respective nozzle parts the prior art liner cooling means cause uneven cooling in the axial direction, subjecting the liners to large temperature gradients from the upstream to downstream ends of the nozzle flaps, particularly during afterburner operation, creating stresses which can reduce the life of the nozzle.

Engine designers have long sought simple, inexpensive, low weight means to shield hot parts and which are able to withstand the harsh environment of aircraft gas turbine engines. To that end there is disclosed, in U.S. patent application Ser. No. 07/614,418 entitled "GAS TURBINE ENGINE MULTI-HOLE FILM COOLED COMBUSTOR LINER AND METHOD OF MANUFACTURE", invented by Wakeman et al., filed Nov. 15, 1990, now U.S. Pat. No. 5,181,379, assigned to the same assignee as the present invention, a single wall annular combustor liner having multi-hole film cooling holes which are disposed through the wall of the combustor liner at sharp downstream angles. The multi-hole film cooling holes are spaced closely together to form at least one continuous pattern designed to provide film cooling over the length of the liner.

Engine designers are constantly seeking means to reduce the use of expensive, in terms of thrust and fuel consumption, cooling air and strive to reduce, as much as possible, the amount of cooling air used to cool the liners. Slot type film cooling uses relatively large amounts of cooling air as compared to the present invention.

SUMMARY OF THE INVENTION

The present invention provides nozzle containment members in the form of flaps and seals that include coolable liners spaced apart from cool walls and towards the hot nozzle exhaust flow forming a cooling passage therebetween that converges in the axial downstream flow direction. Preferably convergence is substantially provided for by narrowing the height of the cooling passage between the liner and the cool wall in the axially downstream direction of the flow. Flap and seal members and their respective liners and cooling passages may be integrally fabricated or formed such as by casting.

The present invention provides a coolable liner apparatus for use on the flap or seal of the nozzle. The preferred embodiment of the present invention provides hollow convergent flaps and seals with a coolable liner unevenly spaced apart from the flap and seal cool wall towards the hot flow so as to provide a downstream converging cooling passage between the cool wall and its liner. The cooling passage converges in the downstream direction such that its outlet area is smaller than its inlet area and convergence is preferably provided by a narrowing height of the passage, defined as the distance between the flap cool wall and its liner, as well as a narrowing width of the passage in the downstream direction. In the case of nozzle seals, that generally have a diverging width in the downstream direction, flow restrictors may be used to provide convergence of the cooling passage. The degree of convergence is a function of the static pressure drop axially along the convergent section of 5 the nozzle. Convergence is preferably designed to maintain a slightly greater static pressure in the cooling passage relative to the static pressure in the convergent section axially downstream through the convergent section.

This feature increases the velocity of the cooling flow in the downstream direction thereby increasing the convective heat transfer between the hot liner and the cooling flow. Furthermore it promotes efficient multi-hole cooling and prevents undesirable backflow of hot flow from the nozzle into the cooling passage. The preferred embodiment is designed to essentially maintain a constant static pressure drop across the liner between the cooling flow and the hot flow along the axial length of the liner.

The preferred embodiment of the invention also provides a single wall multi-hole film cooling nozzle liner particularly for use individually or in combination on convergent and divergent flaps and seal containment members particularly for variable exhaust nozzles.

In one embodiment the circumferentially continuous arrangement of alternating hollow convergent flaps and seals provides a means for film cooling the divergent flaps and seals by having slot type cooling film starters at the downstream end of the convergent nozzle and flaps that curve around the nozzle throat section so as to provide a slot type opening to direct a film cooling flow onto the divergent flaps and seals.

The preferred embodiment provides convergent flap and seal liners with a multi-hole film cooling hole pattern having an increasing hole density in the axial downstream direction to provide increasing amounts of multi-hole film cooling air. This feature essentially matches the cooling distribution in the axially downstream direction to the axially downstream increase in convective heating of the liners by the hot gas flow which is accelerated to sonic speed at the throat of the nozzle.

Another embodiment provides a convergent divergent variable exhaust nozzle assembly having hollow flaps and seals employing convergent and divergent flap and seal multi-hole film cooled liners whereby divergent flap and seal liners are supplied with cooling air from respective convergent flap and seal cooling passages.

ADVANTAGES

Gas turbine engine nozzle hollow convergent flaps and seals having axially downstream convergent cooling passages in accordance with the present invention improve both the convective and the multi-hole film cooling effectiveness of the cooling air, usually fan air or compressor air, used to cool the nozzle thereby allowing for a reduction in the amount of cooling air used. The present invention also enhances nozzle flap and seal cooling by providing more even cooling which dramatically reduces the axial temperature gradients typically found in conventional convection and film cooled nozzle flap liners. Reduction of these thermal gradients reduces thermal stress thereby improving low cycle fatigue life.

BRIEF DESCRIPTION OF THE DRAWINGS

The foregoing aspects and other features of the invention are explained in the following description, taken in connection with the accompanying drawings where:

FIG. 1 is a diagrammatic cross sectional view through flaps of a variable exhaust nozzle in accordance with the preferred embodiment of the present invention for use in a typical gas turbine engine afterburning exhaust section.

FIG. 1A is a diagrammatic cross sectional view through seals of a variable exhaust nozzle in accordance with the preferred embodiment of the present invention for use in a typical gas turbine engine afterburning exhaust section.

FIG. 2 is a diagrammatic cross sectional view of a variable exhaust nozzle in accordance with another embodiment of the present invention for use in a typical gas turbine engine afterburning exhaust section.

FIG. 3a is a flat planform view of a flap liner hot surface depicting a cooling hole pattern in accordance with the preferred embodiment of the present invention.

FIG. 3b is a flat planform view of a flap liner hot surface depicting an alternative cooling hole pattern in accordance with one embodiment of the present invention.

FIG. 4 is a perspective view of a flap assembly with adjacent seals in accordance with the present invention.

FIG. 4a is a perspective view of the attachment means of the flap liner assembly in FIG. 4.

FIG. 5 is an enlarged perspective view of a portion of the flap liner in FIG. 4 illustrating the multi-hole film cooling holes.

DETAILED DESCRIPTION OF THE INVENTION

Figure 6:
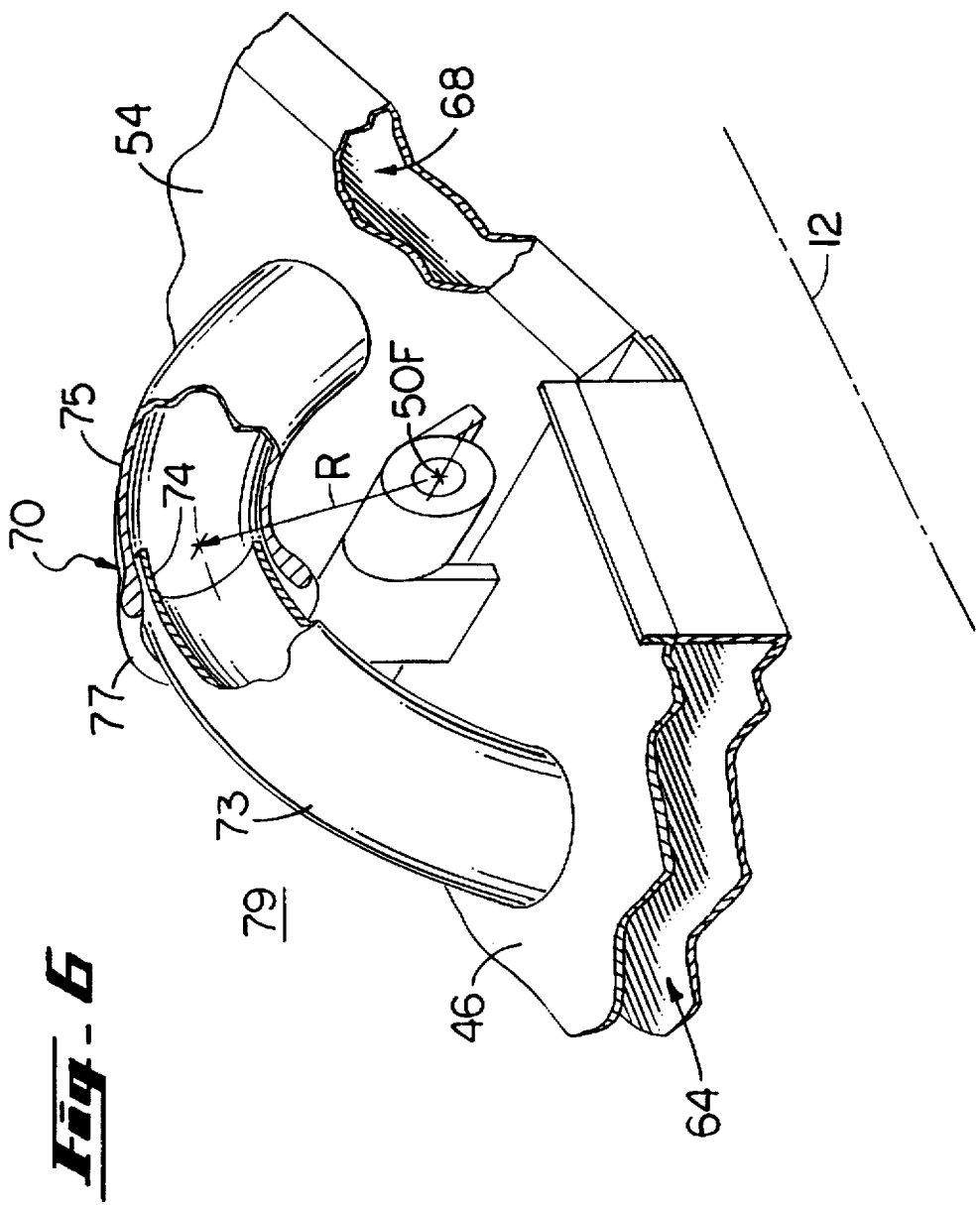
FIG. 6 is an enlarged view of the cooling air transfer and ejector apparatus in FIGS. 1 and 1A.

FIGS. 1 and 1A illustrate an aft portion of an afterburning exhaust section 10 of aircraft gas turbine engine circumferentially disposed about an engine centerline 12. Exhaust section 10 includes an annular case 26 and an annular afterburner liner 28 radially inward of case 26 forming an afterburner cooling flowpath 29 therebetween for containing a hot exhaust gas flow 32. A variable exhaust nozzle 34 is circumferentially disposed about engine centerline 12 downstream of afterburner liner 28 and is operable to receive cooling air from afterburner cooling flowpath 29.

Nozzle 34 includes, in serial flow relationship, a convergent section 38, a variable area throat 40 and a divergent section 42. Nozzle 34 includes a circumferentially disposed plurality of convergent hollow flaps 46 pivotally connected at the forward end 48 to casing 26. Convergent flap 46 is pivotally connected at its aft end, at a flap pivot point 50F, to a respective divergent flap 54 thereby forming throat 40 therebetween. The circumferential spaces between flaps are sealed by interflap convergent and divergent hollow seals 55 and 63 shown in FIG. 1A. The circumferential arrangement of convergent flaps and interflap convergent seals 55 is shown in FIG. 4.

Referring again to FIG. 1, in order to protect the nozzle from thermal degradation due to hot gas flow 32, convergent and divergent flaps 46 and 54 are provided with respective convergent and divergent flap liners 60C and 60D spaced apart from convergent and divergent flap cool walls 43 and 143 respectively forming respective cooling passages 64 and 68 therebetween. cooling air is received from afterburner cooling air flowpath 29 and supplied to convergent flap cooling air passage 64 which feeds cooling air to divergent flap cooling air passage 68 through a cooling air transfer means generally shown at 70. Flap and liner assemblies having cooling air passages therebetween, as described above, may also be referred to as hollow flaps and are preferably cast as a unitary part. Convergent flap cooling air passage 64 converges in the downstream cooling flow direction which is in the same direction as hot exhaust gas flow 32.

Referring to FIG. 1A, convergent and divergent seals 55 and 63 are provided with respective convergent and divergent seal liners 56 and 65 spaced apart from convergent and divergent seal cool walls 83 and 183 respectively, forming respective convergent and divergent seal cooling passages 164 and 168 therebetween. Cooling air is received from afterburner cooling air flowpath 29 used for film cooling the seals in the same manner as for the convergent and divergent in FIG. 1. flaps in FIG. 1.

Referring briefly to FIG. 4, the present invention provides similarly cooled hollow interflap convergent seals 55 including a seal cool wall 53 spaced apart from convergent seal liners 56 forming convergent seal cooling air passages 67 that converge in the downstream cooling flow direction.

Referring again to FIG. 1, a means used to provide a cooling passage that converges in the downstream cooling flow direction is a narrowing of the height of the passage.

Convergent flaps typically narrow in width in the downstream direction, as shown in FIG. 4, however, the degree to which they narrow is insufficient to increase flow speed and provide good heat transfer efficiency within convergent flap cooling air passage 64. Therefore the present invention provides a convergent flap cooling air passage 64 that narrows in height, and flow area such as Al, defined for the purpose of this invention as the distance between the flap or seal and its respective liner of cooling air passages referred to herein, in the downstream cooling flow direction such that an inlet height Hl is greater than an outlet height H2.

The degree of convergence is a function of the static pressure drop axially along the convergent section of the nozzle. Convergence is preferably designed to maintain a slightly greater static pressure in the cooling passage relative to the static pressure in the convergent section axially downstream through the convergent section.

This feature increases the velocity of the cooling flow in the downstream direction thereby increasing the convective heat transfer between the hot liner and the cooling flow. Furthermore it promotes efficient multi-hole cooling and prevents undesirable backflow of hot flow from the nozzle into the cooling passage. The preferred embodiment is designed to essentially maintain a constant static pressure drop across the liner between the cooling flow and the hot flow along the axial length of the liner.

Referring again to FIG. 4, a means is provided to converge convergent seal cooling air passages 67 so that it converges in the downstream cooling flow direction. However, unlike convergent flaps, convergent seals typically grow wider in width in the downstream direction, as shown in FIG. 4, and therefore the degree to which a convergent seal air flow passage's inlet height H1a is greater in height than its outlet height H2a is greater than for a convergent flap air passage 64.

Additional means of converging convergent seal cooling air passage 67 is provided by a flow restriction means 62 in seal cooling air passage 67, illustrated as comprising a pattern of pins 66 having an increasing density in the down stream direction. Other types of flow restrictors are contemplated by the present invention such as wedge shaped walls, placed in the air passage. Flow restrictors may be aerodynamically oriented, shaped, and have a density to gradually restrict the flow in convergent seal cooling air passage 67 so as to provide an additional degree of convergence with a minimum amount of pressure loss.

Referring to FIGS. 1 and 6, the present invention provides a cooling air transfer means 70, as shown in FIG. 1, having a convergent flap transfer tube 73 operable to receive cooling air from convergent flap cooling air passage 64 and having an aft portion 74 slidably engaged within a divergent flap transfer tube 75 which conveys the cooling air to divergent flap cooling air passage 68. Convergent flap transfer tube 73 and divergent flap transfer tube 75 are configured about flap pivot point 50F between convergent and divergent flaps 46 and 54 respectively such that their radii of curvature R have centers that coincide with flap pivot point 50F. This is so that, as divergent flap 54 pivots with respect to convergent flap 46, convergent flap transfer tube 73 slides within divergent flap transfer tube 75. Though both tubes might typically have circular cross sections with respect to a plane perpendicular to engine centerline 12, it is contemplated that they may have otherwise shaped axially facing cross sections.

Divergent flap transfer tube 75 has an ejector like inlet 77 and an inner diameter that is sufficiently larger the outer diameter of convergent flap transfer tube 73 in order to slidably receive convergent flap transfer tube 73 and to induce supplemental cooling air into divergent transfer tube 73 from engine nozzle bay 79. Ejector like inlet 77 is aerodynamically shaped, flared, to enhance its ejector function to draw in cool air from nozzle bay 79 which is essentially open to aircraft engine bay air. A similar cooling air transfer means 70 is provided for the seals as indicated in FIG. 1A.

A means to tightly attach a liner to its respective flap is illustrated in FIG. 4 for convergent flap liner 60C. Attachment of convergent flap liner 60C to convergent flap 46 is provided by four equi-quadrantly spaced axially slidable mounts 120 shown in greater detail in FIG. 4a. A dovetail 120D mounted to convergent liner 60C is engaged within the slot of a slotted lug 120S mounted to the flap 46. A fixing means illustrated by a centrally located nut and bolt attachment means 124 essentially axially fixes the flap and liner assembly while axially slidable mounts 120 allow for differential thermal growth between convergent flap 46 and liner 60C. The bolt attachment means 124 helps keep convergent flap 46 and its respective liner 60C tightly assembled in order to provide an effective convergent flap cooling air passage 64 therebetween.

FIG. 3a illustrates an example of a multi-hole film cooling pattern in accordance with the preferred embodiment wherein the pattern has an equal number of cooling holes 80 in each row so that the density of film cooling holes 80 on convergent flap liners 60C of convergent flap 46 increases in the axial downstream direction from a wide forward end 46F to a narrow aft end 46A. A similarly spaced pattern could be used on convergent seal liner 56 that typically has an aft end wider than its forward end so that it would not have the same number of holes in each row of holes. FIG. 3b illustrates an example of an alternate pattern that has essentially equal spacing between adjacent cooling holes 80 in each row and between each row of holes. In addition, adjacent rows of holes R1 and R2, as depicted in FIG. 5, are transversely offset from each other by about half the distance between holes in order to provide a more uniform distribution of cooling air.

Referring to FIG. 5, a frame of reference is provided having axes labelled X, Y, and Z wherein X indicates the downstream direction of the flow along the surface of the liner, Y is in the circumferential direction, and Z is normal to the nozzle flap liner surface on the surface of the liner. The means for providing multi-hole film cooling, shown in greater detail in FIG. 5, comprises a plurality of very narrow closely spaced sharply downstream (indicated by arrow 30) angled film cooling holes 80 which are axially rearward slanted from cold surface 57 to hot surface 61 of liner 60C at an angle in the range of about 15° to 20°.

It has been found that from a manufacturing and cost standpoint a downstream slant angle A of about 20° is preferred. Smaller downstream slant angles A may be advantageous for improved cooling and therefore an alternative downstream slant angle A in the range of about 20° to 15° may be used if the associated costs are warranted. The holes have a preferred diameter of 20 mils (0.02 inches) and are spaced in the range of 200–400 mils apart, as measured between their respective center-lines 83.

As can be seen in FIG. 5 axially adjacent rows R1 and R2 of holes 80 are circumferentially offset by about half the angle or distance between circumferentially adjacent holes of the previous row of cooling holes in order to provide a more even circumferential distribution of cooling air and to further enhance the evenness and effectiveness of the cooling film. Circumferentially adjacent cooling holes 80 have an interhole spacing S and an interrow spacing P between axially adjacent rows R1 and R2 of cooling holes 80 in the same range of 10–20 hole diameters D with a preferred value of 15. In order to provide a more even circumferential distribution of cooling air, axially adjacent rows R1 and R2 of holes 80 are circumferentially offset by about half the angle or distance between circumferentially adjacent holes or the previous row of cooling holes to further enhance the evenness and effectiveness of the cooling film.

Referring to FIG. 5, liner thickness T, multi-hole film cooling hole spacing S, film cooling hole length L and diameter D, and cooling hole angle A of cooling holes 80 are a function of the cooling flow requirements to meet the durability characteristics of the particular engine in which it is used and to minimize the amount of cooling air used.

An alternative embodiment shown in FIG. 2 provides a convergent flap liner 60C with multi-hole film cooling means depicted by multi-hole film cooling holes 80 for cooling convergent flap 46. A slot type film cooling means 78 at the aft end of convergent flap 46 provides film cooling for divergent flap 54. Slot type film cooling means 78 preferably includes a curved liner extension 203 having a radius of curvature originating at flap pivot point 50F so as to maintain a predetermined clearance with divergent flap 54.

While the preferred embodiment of our invention has been described fully in order to explain its principles, it is understood that various modifications or alterations may be made without departing from the scope of the invention as set forth in the appended claims.

We claim:

1. A nozzle flap and liner attachment means for attaching a coolable liner to its respective nozzle flap, said nozzle flap and liner attachment means comprising:

at least one axially slidable dovetail engaged within a mating dovetail slot of a lug wherein each of one of said dovetails is attached to one of said flaps and each of said lugs is attached to a respective one of said liners, and a fixing means for generally axially fixing said liner relative to said flap when said dovetail and said slot are axially engaged while permitting differential thermal growth between said flap and said liner.

2. A nozzle flap and liner attachment means as claimed in claim 1 wherein said fixing means comprises a centrally located nut and bolt attachment means.

3. A nozzle flap and liner attachment means as claimed in claim 2 wherein said attachment means further comprises four equi-quadrantly disposed ones of said axially slidable dovetails and mating dovetail slots and lugs.

* * * * *